(12) United States Patent
Ciccarello et al.

(10) Patent No.: US 12,445,088 B2
(45) Date of Patent: Oct. 14, 2025

(54) APPARATUS AND METHOD FOR ACQUIRING CONCENTRATED SOLAR ENERGY

(71) Applicants: Leon Ciccarello, New Hope, PA (US); Christopher James, New Hope, PA (US)

(72) Inventors: Leon Ciccarello, New Hope, PA (US); Christopher James, New Hope, PA (US)

( * ) Notice: Subject to any disclaimer, the term of this patent is extended or adjusted under 35 U.S.C. 154(b) by 0 days.

(21) Appl. No.: 18/082,408

(22) Filed: Dec. 15, 2022

(65) Prior Publication Data

US 2023/0198461 A1 Jun. 22, 2023

Related U.S. Application Data

(60) Provisional application No. 63/290,911, filed on Dec. 17, 2021.

(51) Int. Cl.
*H02S 40/22* (2014.01)
*H02S 20/32* (2014.01)

(52) U.S. Cl.
CPC ............. *H02S 40/22* (2014.12); *H02S 20/32* (2014.12)

(58) Field of Classification Search
CPC .......... H02S 40/22; H02S 20/32; H02S 40/44; F24S 23/79; F24S 30/428; F24S 10/70; F24S 80/54; F24S 23/74; F24S 50/20; F24S 2020/17; F24S 20/20; F24S 23/71; F24S 2020/23; F24S 2023/834; H01L 31/0547; Y02E 10/52; Y02E 10/60
See application file for complete search history.

(56) References Cited

U.S. PATENT DOCUMENTS

| | | | |
|---|---|---|---|
| 2009/0126774 A1* | 5/2009 | Taylor, II ............... | G05D 3/105 136/244 |
| 2013/0213455 A1* | 8/2013 | Matalon ................... | F24S 40/52 126/634 |
| 2013/0220312 A1* | 8/2013 | Stettenheim ............ | F24S 10/75 126/714 |

* cited by examiner

*Primary Examiner* — Michael Y Sun
(74) *Attorney, Agent, or Firm* — Mohr Intellectual Property Law Solutions, PC (57) ABSTRACT

A system and method for solar energy concentration is provided. One embodiment has a reflective trough with a reflective upper surface that reflects incident sunlight energy towards a focal line; a solar evacuated tube heat collector defined by a transparent fluid container member that has a length that corresponds to a length of the reflective upper surface of the reflective trough, wherein the solar evacuated tube heat collector is located along the focal line associated with the reflective trough such that an interior of the transparent fluid container member encompasses the focal line; and a wave guide located above and in proximity to the solar evacuated tube heat collector having a length corresponding to the length of the solar evacuated tube heat collector, wherein a lower surface of the wave guide has a reflective lower surface that reflects incident sunlight energy downwards onto the solar evacuated tube heat collector.

10 Claims, 8 Drawing Sheets

APPARATUS AND METHOD FOR ACQUIRING CONCENTRATED SOLAR ENERGY

PRIORITY CLAIM

This application claims priority to U.S. Provisional Application, Ser. No. 63/290,911, filed on Dec. 17, 2021, entitled Systems and Methods For Acquiring Concentrated Solar Energy, which is hereby incorporated by reference in its entirety for all purposes.

BACKGROUND OF THE INVENTION

Society is embarking on the process of reducing fossil fuel energy use to renewable energy. A significant source of renewable energy is the sun. Heat can be captured from the sun's solar energy and moved to where the heat can be used, such as for heating a space. Solar energy can be used for direct generation of electricity using photovoltaic cell technologies.

However, sunlight-based solar energy systems that are modular, scalable, and simple in design are elusive. Further, solar energy systems are configured to generate a single type of energy, heat or electricity, not both.

Accordingly, in the arts of renewable energy using the sun's solar energy, there is a need in the arts for improved methods, apparatus, and systems for capturing heat and generating electricity from solar energy.

BRIEF DESCRIPTION OF THE DRAWINGS

Embodiments of the concentrated solar energy system provide a system and method for concentrating solar energy. One embodiment has a reflective trough with a reflective upper surface that reflects incident sunlight energy towards a focal line; a solar evacuated tube heat collector defined by a transparent fluid container member that has a length that corresponds to a length of the reflective upper surface of the reflective trough, wherein the solar evacuated tube heat collector is located along the focal line associated with the reflective trough such that an interior of the transparent fluid container member encompasses the focal line; and a wave guide located above and in proximity to the solar evacuated tube heat collector having a length corresponding to the length of the solar evacuated tube heat collector, wherein a lower surface of the wave guide has a reflective lower surface that reflects incident sunlight energy downwards onto the solar evacuated tube heat collector.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
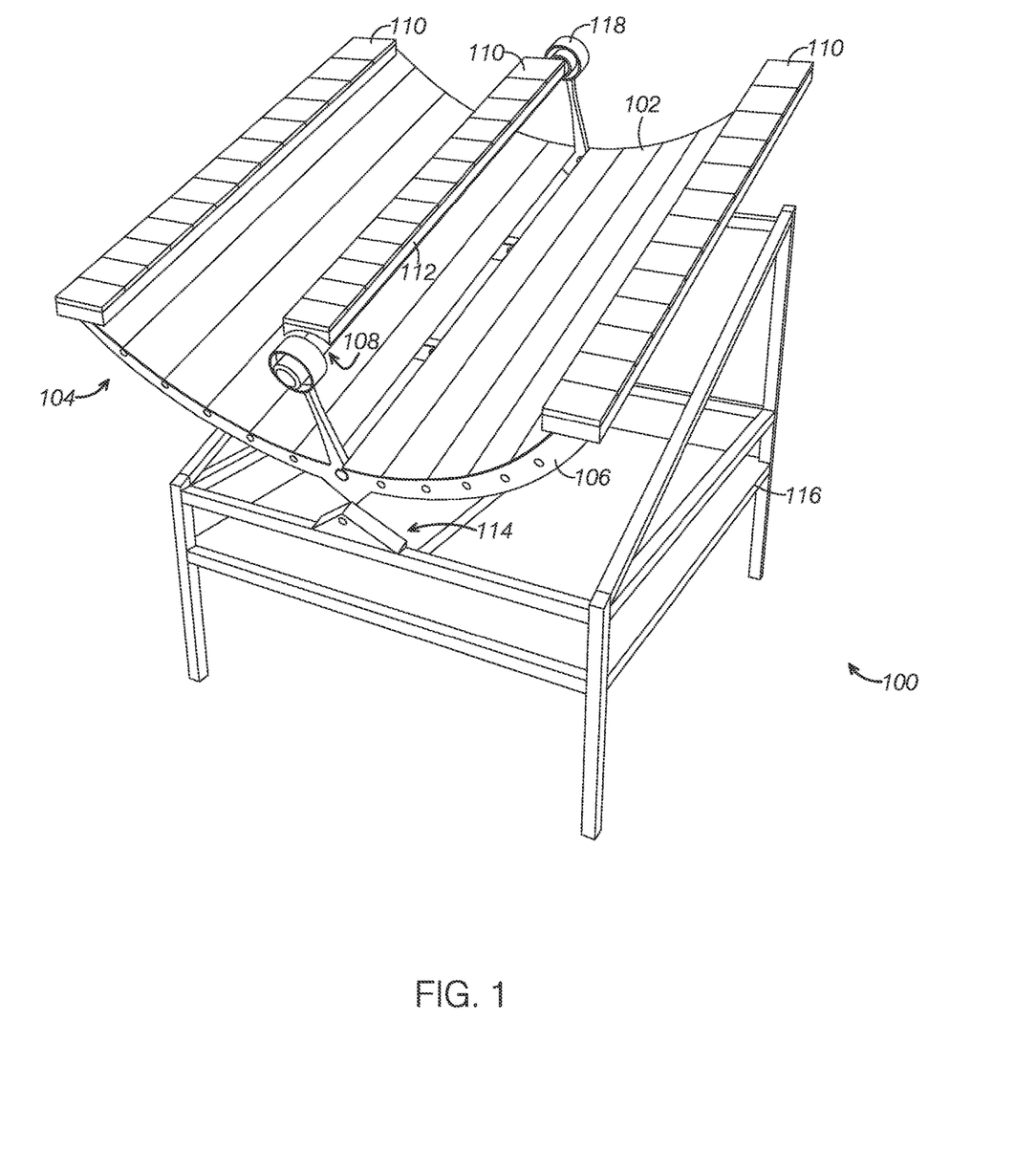
FIG. 1 is a perspective view of a concentrated solar energy system.

FIG. 1 is a perspective of a concentrated solar energy system 100. Embodiments of the concentrated solar energy system 100 comprise a reflective trough 102, a cradle 104 with a front end stringer 106 and a back end stringer 106 that support a solar evacuated tube heat collector 108, a plurality of photovoltaic cell units 110, and a wave guide 112. The concentrated solar energy system 100 is secured to a gimbal 114 that enables the concentrated solar energy system 100 to actively move the reflective trough 102 to an optimized orientation to concentrate and collect the sun's solar energy. The cradle 104 secures the reflective trough 102, the solar evacuated tube heat collector 108, and the wave guide 112 in position with respect to each other.

The disclosed systems and methods for a concentrated solar energy system 100 will become better understood through review of the following detailed description in conjunction with the figures. The detailed description and figures provide examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

Throughout the following detailed description, a variety of examples for systems and methods for a concentrated solar energy system 100 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components. "Secured to" means directly connected without intervening components.

"Communicatively coupled" means that an electronic device exchanges information with another electronic device, either wirelessly or with a wire based connector, whether directly or indirectly through a communication network. "Controllably coupled" means that an electronic device controls operation of another electronic device.

Returning to FIG. 1, a preferred embodiment of the concentrated solar energy system 100 may actively move the reflective trough 102 to an optimized orientation to concentrate and collect the sun's solar energy. The gimbal 114 is secured to the cradle 104 to enable movement of the concentrated solar energy system 100. In alternative embodiments, the concentrated solar energy system 100 is stationary.

The gimbal 114 is coupled to a support 116 so that the concentrated solar energy system 100 is maintained in a selected location. Any gimbal 114 and/or suitable support 116 may be used in the various embodiments. In the illustrated embodiment, the gimbal 114 is a member that is secured to the support 116 (or that is formed as an integrated component of the support 116 in a unibody structure). The gimbal 114 is rotatably secured to the cradle 104.

In the various embodiments, the front and back end stringers 106 include an upward directed support member 118 that is configured to support and secure the solar evacuated tube heat collector 108 and the wave guide 112 in a predefined location above the reflective trough 102. Optionally, one or more of the plurality of center stringers 202 (FIG. 2) may also include a support member 118.

In the various embodiments, the lower surface and side surfaces of the solar evacuated tube heat collector 108 (and more particularly, the lower and side surfaces of the transparent fluid container member 108a) receive reflected solar energy from the reflective trough 102. The top surface of the solar evacuated tube heat collector 108 (and more particularly the top surface of the transparent fluid container member 108a) does not directly receive reflected solar energy from the reflective trough 102. Energy conversion efficiency of the concentrated solar energy system 100 is increased by the wave guide 112 since the lower reflective surface of the wave guide 112 reflects solar energy received from the reflective trough 102 onto the top surface of the solar evacuated tube heat collector 108.

Figure 2:
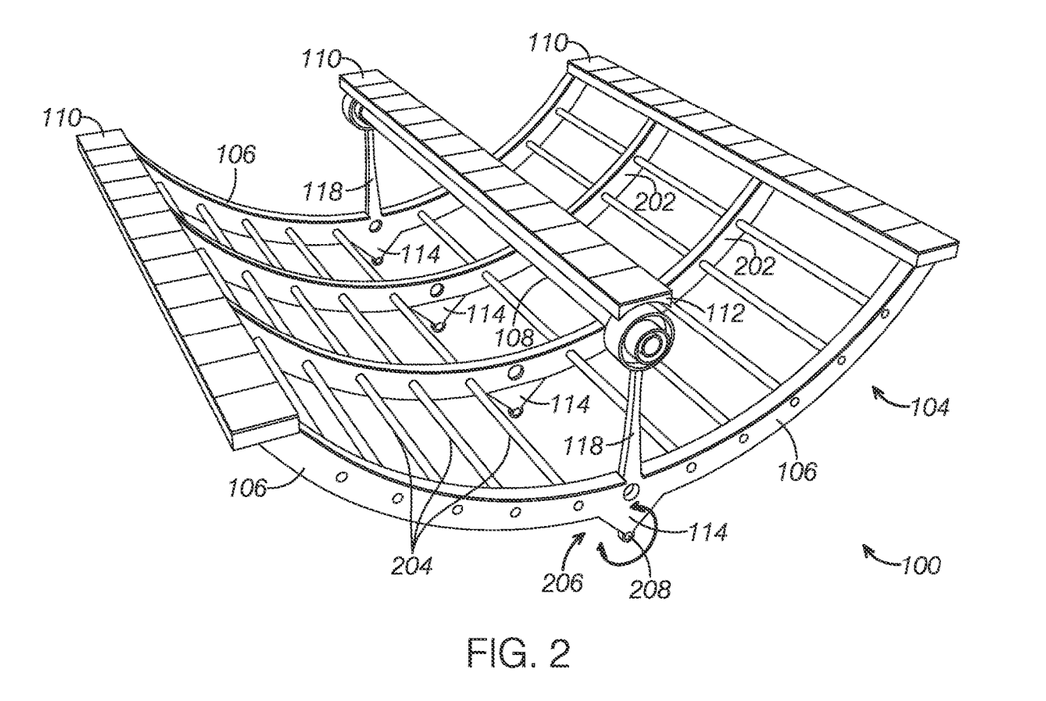
FIG. 2 is a perspective of selected components of a concentrated solar energy system.

FIG. 2 is a perspective of selected components of a concentrated solar energy system 100. Here, the reflective trough 102 (FIG. 1) has been removed to expose components of the cradle 104. The cradle 104 comprises the front and back end stringers 106, and optionally, a plurality of center stringers 202. A plurality of securing members 204, such as rods or the like, secure the front and back end stringers 106 and any intervening center stringers 202 together in a rigid manner such that the stringers 106, 202 do not move relatively to each other. That is, the front and back end stringers 106, the plurality of center stringers 202, and the connecting members 204 cooperatively operate to create a rigid cradle 104 to support the other components of the concentrated solar energy system 100.

Scalability of the concentrated solar energy system 100 is achieved in two manners. The size and dimensions of the stringers 106, 202 may be designed so as to create a designed surface area of the reflective trough 102. Further, the reflecting length of the reflective trough 102 may be defined by its physical length, wherein any suitable number of center stringers 202 can be placed in the cradle 104 to provide a desired level of rigidity and length for the reflective trough 102. Here, one skilled in the art appreciates that the surface area of the reflective trough 102 will define, in part, the amount of solar energy that is reflected up towards the solar evacuated tube heat collector 108 and the wave guide 112.

The front and back end stringers 106 each include a gimbal connection member 206 that is used to connect the cradle 104 to the gimbal 114. When connected to the gimbal 114, the cradle 104 is able to selectively rotate about a pivot point 208. Optionally, the plurality of optional center stringers 202 also include an optional gimbal connection member 206 to further secure the cradle 104 to the gimbal 114. Here, the support 116 would have cross members with a gimbal 114 thereon for rotatably securing the center stringers 202 to the support 116.

One skilled in the arts appreciates that the solar evacuated tube heat collector 108 is placed along the focal line 904 (FIG. 9) where incident sunlight is reflected towards. The solar evacuated tube heat collector is defined by a transparent fluid container member 108a (FIG. 9) that preferably has a length that corresponds to a length of the reflective upper surface of the reflective trough. The interior of the solar evacuated tube heat collector is located along the focal line associated with the reflective trough such that an interior of the transparent fluid container member 108a encompasses the focal line. The transparent fluid container member 108a may be made of any suitable transparent material, such as, but not limited to, borosilicate glass, that permits sunlight energy to inter into the evacuated tube heat collector 108 so that a fluid residing within the transparent fluid container member 108a is heated by the received sunlight energy.

The components of the cradle 104 may be made of any suitable material and may be fabricated in any suitable manner. Components of the cradle 104 may be made of metal, plastics, wood or the like. The components of the cradle 104 may be fabricated by casting, molding, machining, extruding or the like. The components may be secured together during an assembly process using welds, fasteners, adhesives or the like. Or, the cradle 104 and/or selected components thereof may be fabricated as a unibody structure.

Figure 3:
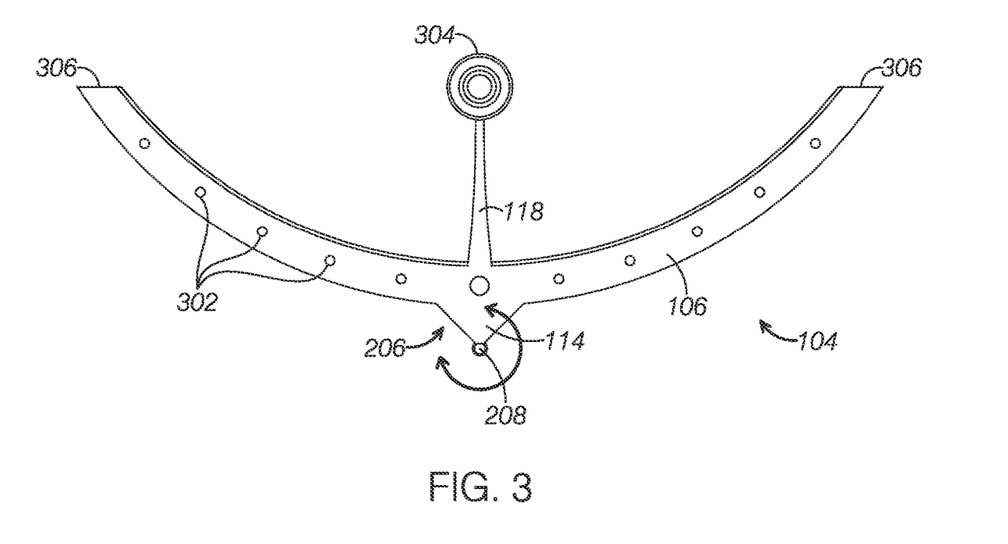
FIG. 3 is a front view of an end stringer.

FIG. 3 is a front view of an end stringer 106. The front and back end stringers 106 may optionally include a series of through-holes 302 that are configured to receive the securing members 204 (FIG. 2). The plurality of center stringers 202 may also include aligned through-holes 302 that receive the securing members 204. For example, if the securing member 204 is a metal rod having a length equal to the length of the reflective trough 102. In an example embodiment, a steel rod 204 may be threaded, wherein the threads are threaded through a threaded aligned through-hole 302 of the stringers 106, 202. Then, the securing member 204 may be optionally further secured to the stringers 106, 202 (or selected ones of the stringers 106, 202) using a weld, fastener, adhesive or the like.

A securing member 304 is included at the top of the support member 118. The securing member 304 is used to secure the solar evacuated tube heat collector 108 in a predefined position above the reflective trough 102 (FIG. 1) corresponding to the focal line 904 (FIG. 9) where incident sunlight from the reflective trough 102 is reflected towards. In an example embodiment, the securing member 304 is a ring shaped member that surrounds an outside surface of the evacuated tube heat collector 108. The ring member may be clamp like in construction so that when secured by a screw, bolt or the like, the evacuated tube heat collector is frictionally held in place. The solar evacuated tube heat collector 108 may be secured using a weld, a suitable fastener, adhesive or the like in alternative embodiments. Any suitable securing means may be used in the various embodiments without departing from the scope of the present invention.

An upper portion of the securing member 304 is also configured to secure the wave guide 112 at a predefined position relative to the solar evacuated tube heat collector 108. The wave guide 112 may be secured to the upper portion of the securing member 304 using a weld, a suitable fastener, adhesive or the like. Any suitable securing means may be used in the various embodiments without departing from the scope of the present invention.

The front and back end stringers 106 at their upper ends includes two end support members 306 that provide a securing point to secure the plurality of photovoltaic cell units 110 (not shown) to a top surface of an edge of the cradle 104. During assembly, one of the plurality of photovoltaic cell units 110 may be secured to the support members 306 of the stringers 106, 202 (that define an edge of the cradle 104) using a weld, a suitable fastener, adhesive or the like.

Figure 4:
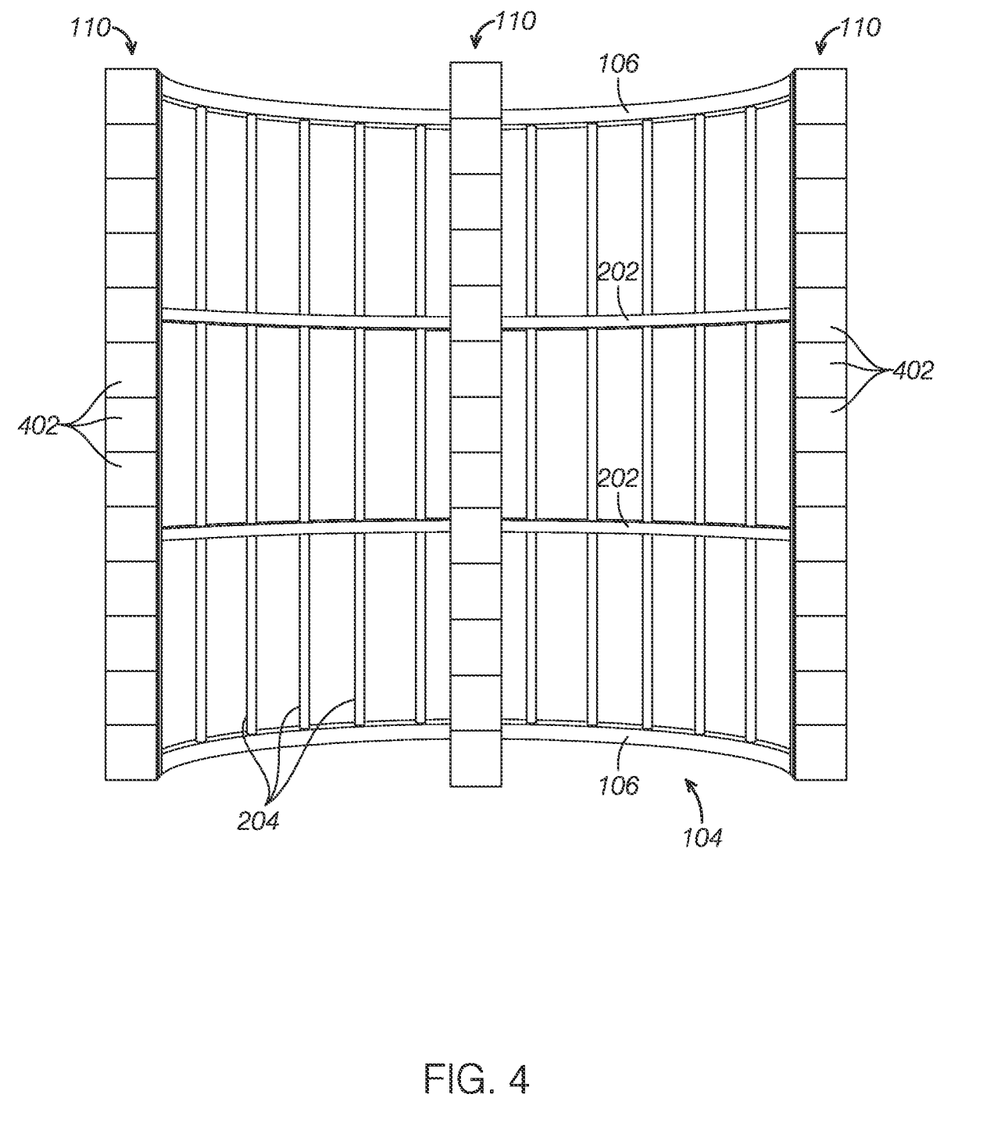
FIG. 4 is a top view of the cradle and the three photovoltaic cell units.

FIG. 4 is a top view of the cradle 104 and the three photovoltaic cell units 108. In an example embodiment, a series of photovoltaic cells 402 are aligned together to create the plurality of photovoltaic cell units 110 that are secured to the side of the cradle 104. Preferably, a substrate supporting the photovoltaic cells is secured to the end support members 306 of one or more of the stringers 106, 202. The plurality of photovoltaic cells 110 are oriented in an upward direction to receive incident sunlight energy so that the received incident sunlight energy is converted to electrical energy.

In a preferred embodiment, a length of the plurality of photovoltaic cell units 110 is the same as, or is substantially the same as, a length of the cradle 104. The length of the plurality of photovoltaic cell units 110 may also defined by a length that corresponds to the length of the solar evacuated tube heat collector 108 and/or the wave guide 112. In the various embodiments, the width of the plurality of photovoltaic cell units 110 may be of any predefined width. One skilled in the art appreciates that the surface area of a photovoltaic cell unit 110 determines the amount of electrical power generated from the incident solar energy. Accordingly, the surface area of the plurality of photovoltaic cell units 110 may be defined to achieve a desired electrical power output when exposed to the sun.

Figure 5:
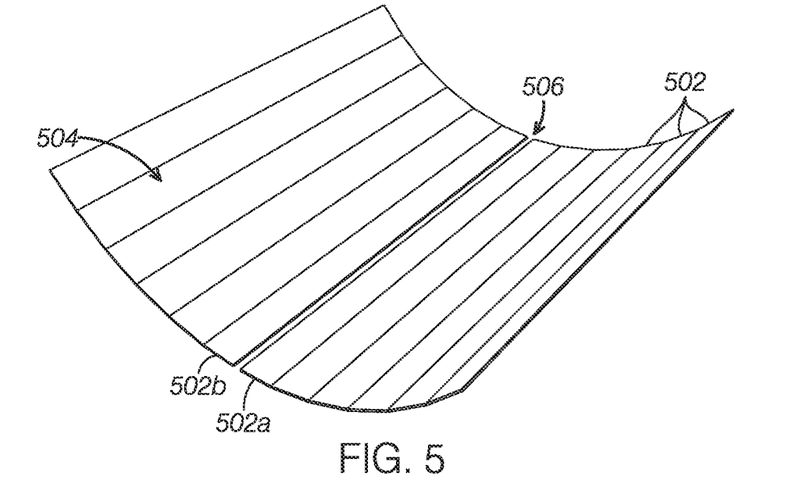
FIG. 5 is a perspective view of a plurality of mirror panels arranged to form the reflective trough.
Figure 6:
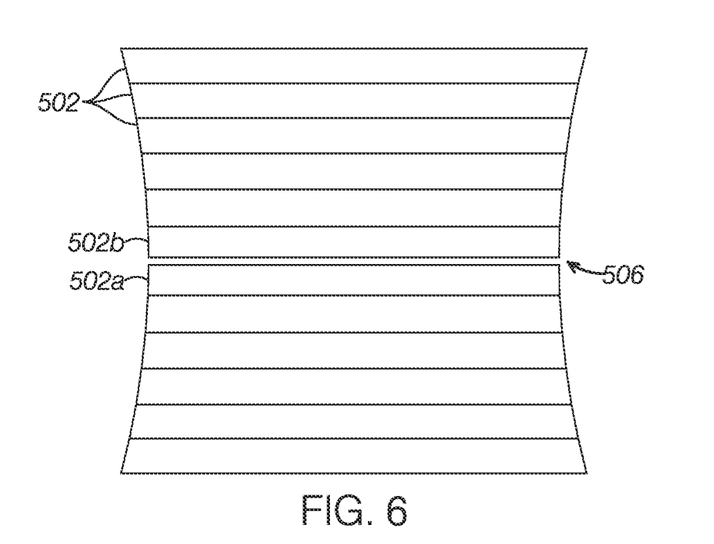
FIG. 6 is a top view of the plurality of mirror panels that form the reflective trough.
Figure 7:
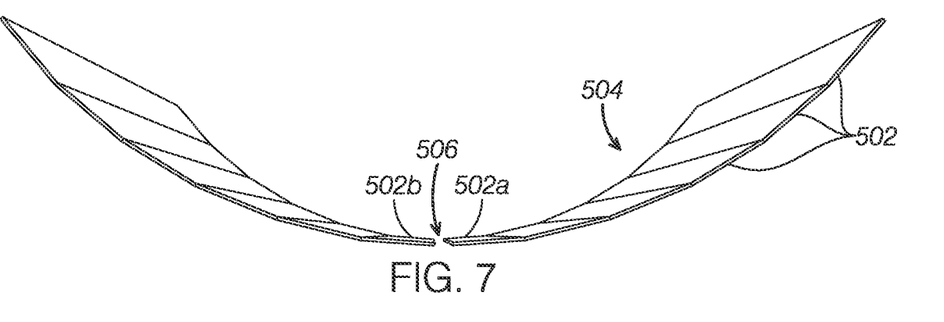
FIG. 7 is a side view of a plurality of mirror panels that form the reflective trough.

FIG. 5 is a perspective view of a plurality of mirror panels 502 arranged to form the reflective trough 102. FIG. 6 is a top view of the plurality of mirror panels 502 that form the reflective trough 102. FIG. 7 is a side view of a plurality of mirror panels 502 that form the reflective trough 102.

An upper surface 504 of the mirror panels 502 is made of a highly reflective material, such as glass, polished metal or another highly reflective material. The lower surface of the mirror panels 502 are configured to be secured to the stringers 106, 202 of the cradle 104. The mirror panels 502 may be secured using a weld, a suitable fastener, adhesive or the like depending upon the characteristics of the material of the mirror panels 502. Preferably, the material of the mirror panels 502 is sufficiently rigid so that no warpage occurs in the mirror panels 502, as such warpage would otherwise degrade the reflection performance of the mirror panels 502.

In a preferred embodiment, each of the mirror panels 502 is made of a flat piece of reflective material. When arranged in a side by side fashion, the plurality of serially arranged mirror panels 502 form the reflective trough 102 with a designed curve that reflects incident sunlight towards the focal line 904 (FIG. 9) where the solar evacuated tube heat collector 108 and the wave guide 112 are located.

Preferably, the length of the mirror panels 502 corresponds to the length of the cradle 104. Further, the length of the mirror panels 502 also corresponds to a length of the solar evacuated tube heat collector 108.

In a preferred embodiment, the two mirror panels 502*a*, 502*b* proximate to the centerline of the reflective trough 102 are separated by a small gap 506. In practice, any liquid that falls onto the upper surface 506 of the reflective trough 102 will be drawn downward by gravity towards the gap 506. The liquid then exits the reflective trough 102 through the gap 506. The liquid may be rain water, melting show, a liquid cleaning fluid or solvent, or the like.

In alternative embodiments, the reflective trough 102 may be formed from a unibody piece of material. For example, the reflective trough 102 may be a formed sheet of metal or the like that has a designed length, width and curvature. The reflective material, coating, or the like can be applied to the top surface 504 of the reflective trough 102. Alternatively, if the material of the mirror panels 502 is reflective, the upper surface 504 may be polished to increase reflectivity.

Figure 9:
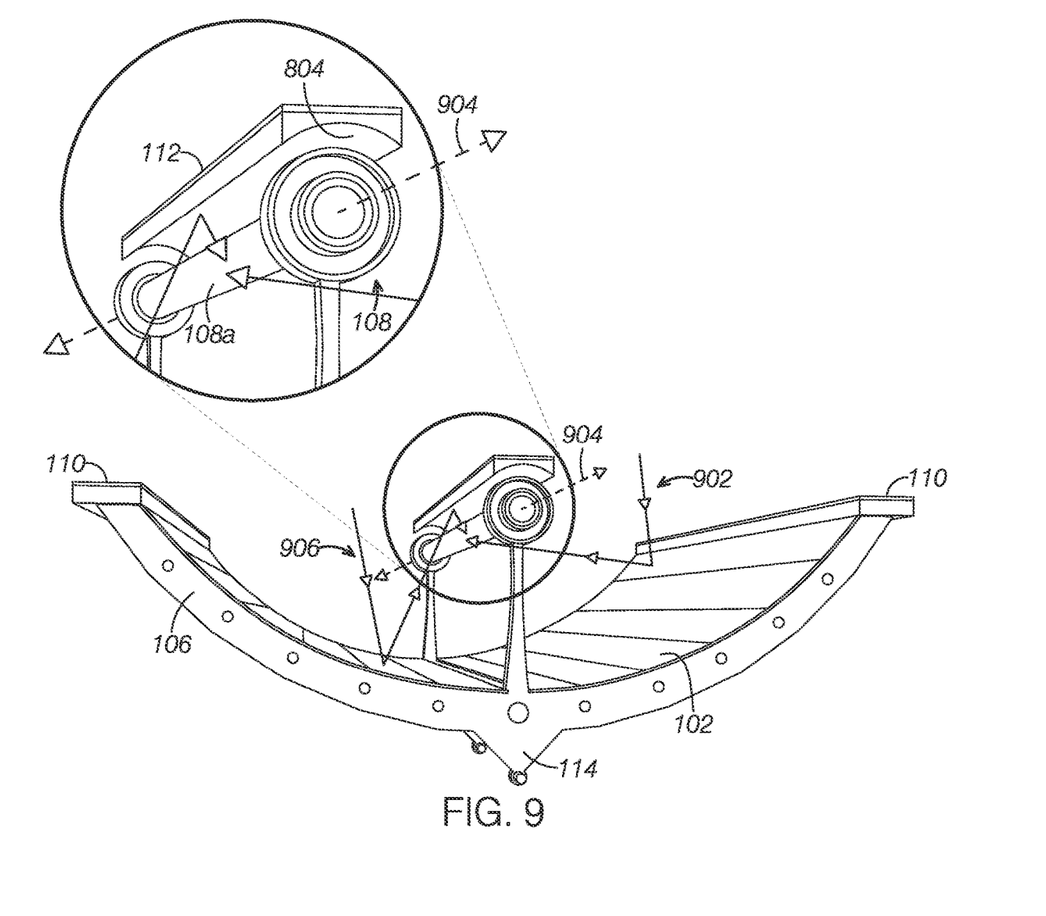
FIG. 9 is a perspective view of the wave guide.

Optionally, the mirror panels 502 may be curved in a predefined manner to better focus reflected light towards the focal line 904 (FIG. 9).

Figure 8:
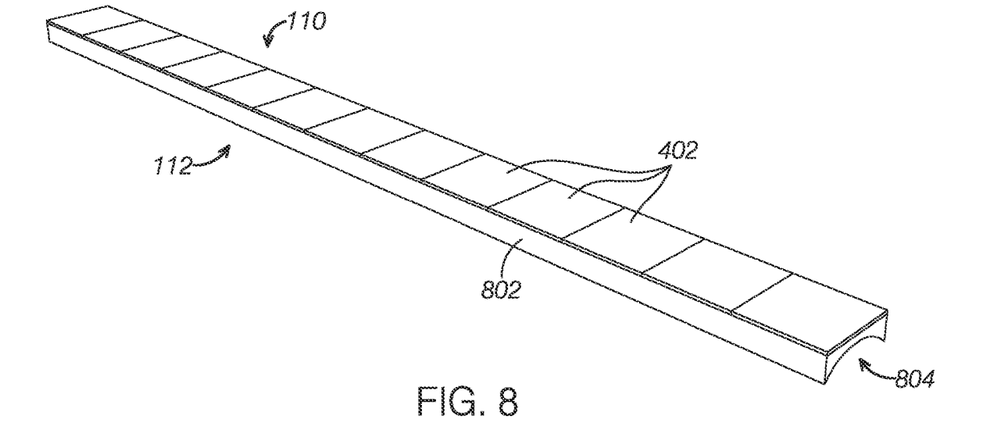
FIG. 8 is a perspective view of the cradle, the heat collector unit, and the wave guide.

FIG. 8 is a perspective view of the top surface and side of the wave guide 112. Preferably, a length of the wave guide 112 corresponds to the length of the solar evacuated tube heat collector 108, and/or corresponds to the length of the reflective trough 102. The plurality of photovoltaic cells 402, arranged to form a photovoltaic cell unit 110, are optionally disposed on the top surface of a wave guide substrate 802. Alternatively, the photovoltaic cell unit 110 is a separate structure that is secured to a top surface of the wave guide 112.

The lower side 804 of the wave guide 112 has a predefined curve, such as, but not limited to a parabolic curve, and is coated with a highly reflective material. Solar energy (sun light) reflected upwards from the reflective trough 102 that is incident on the lower reflective surface 804 of the wave guide 112 is then reflected down onto the solar evacuated tube heat collector 108. Here, the reflective trough 102 and the wave guide 112 cooperatively concentrate the incident solar energy onto the solar evacuated tube heat collector 108.

FIG. 9 is a side view of the cradle, the heat collector unit 106, and the wave guide. FIG. 9 further includes an exploded view of the wave guide 112 illustrating the transparent fluid container member 108*a* that is disposed above the solar evacuated tube heat collector 108.

The exemplary incident solar energy (sunlight) 902 is reflected upward from the reflective trough 102 and onto the solar evacuated tube heat collector 108. The solar energy associated with the conceptually illustrated sunlight 902 (represented as an arrowed line) is absorbed by the solar evacuated tube heat collector 108 and is then transformed into heat energy as the solar energy heats the medium within the solar evacuated tube heat collector 108.

One skilled in the art appreciates that the solar evacuated tube heat collector 108 is placed along the focal line 904 where the sunlight is reflected to. In a preferred embodiment, the curvature of the reflective trough 102 is designed so that as much of the incident sunlight is reflected towards the focal line 904. Accordingly, any object placed in the focal line 904, such as the solar evacuated tube heat collector 108, will receive the reflected sunlight.

One skilled in the art appreciates that some determinable amount of the reflected sunlight that is reflected upward from the reflective trough 102 will not be incident on the solar evacuated tube heat collector 108. However, a portion of this sunlight will be incident on the reflective lower side 804 of the wave guide 112. For example, the conceptually illustrated sunlight 906 is reflected upward from the reflective trough 102 and becomes incident on the reflective lower side 804 of the wave guide 112. This sunlight 906 is then reflected downward onto the surface of the solar evacuated tube heat collector 108, and/or into the solar evacuated tube heat collector 108, and is then converted into heat energy.

The solar energy that is converted into heat energy that is stored by the working fluid within the transparent fluid container member 108*a* can then be transferred from the solar evacuated tube heat collector 108 to another device. Depending upon the intended use of the collected heat energy, the device may generate electricity and/or transfer the heat to another medium, such as the ambient air for air conditioning.

Figure 10:
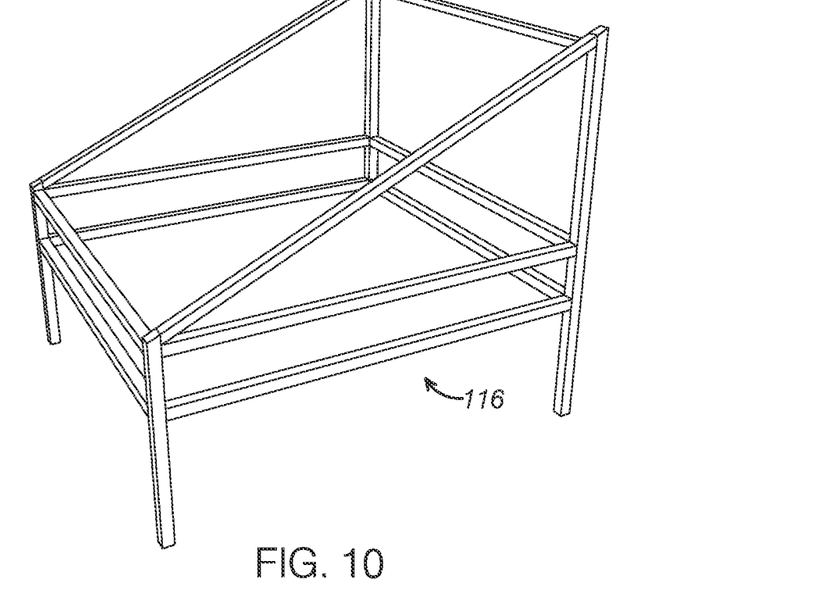
FIG. 10 is a side perspective view of the frame of the support.

FIG. 10 is a side perspective view of the frame structure of the support 116. The support 116 may be made of any suitable material that is strong enough to support the concentrated solar energy system 100, particularly during adverse weather conditions. The support 116 may be a permanent structure mounted to a ground structure (such as a cement foundation) or to another surface, such as a side or roof of a building, the sides of a tower, or the like. Alternatively, the support 116 may be portable. Wheels, skids or the like may be disposed on the ends of one of more of the legs of the support 116 for easy movement and/or repositioning of the concentrated solar energy system 100. In some embodiments, the support 116 may be foldable and/or may be disassembled to facilitate transportation of the concentrated solar energy system 100 to an installation site.

Figure 11:
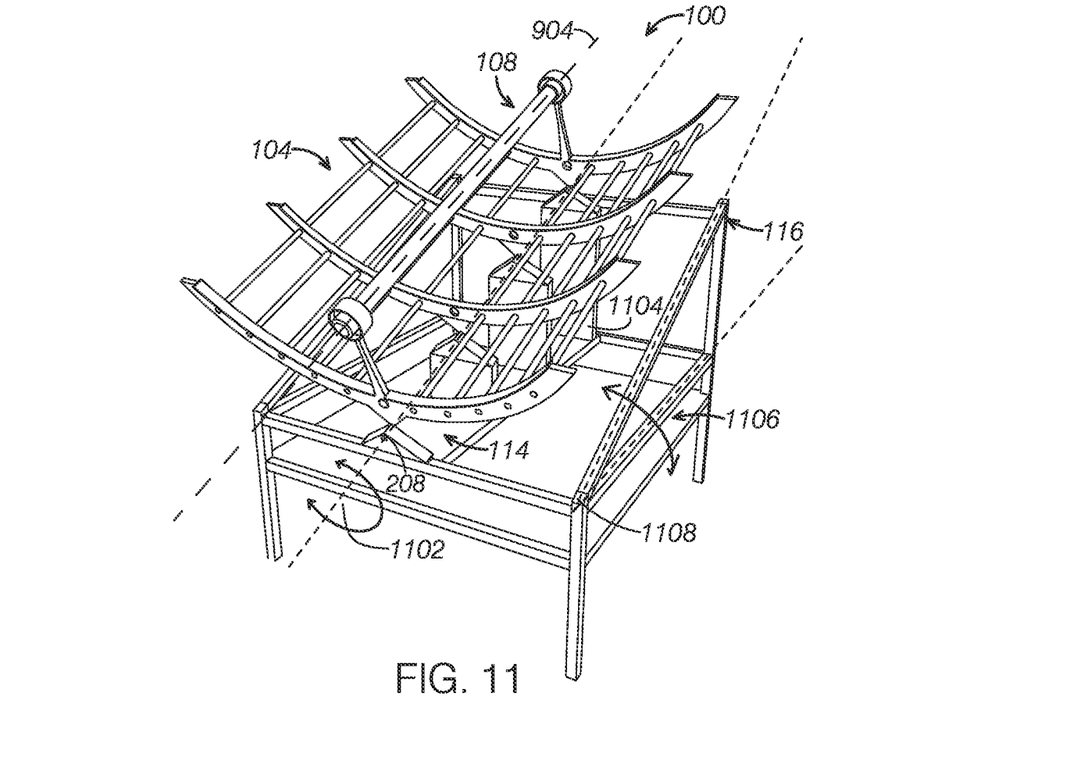
FIG. 11 is a front perspective view of the cradle and the solar evacuated tube heat collector 108 secured to the support via the gimbal.

FIG. 11 is a front perspective view of the cradle 104 and heat collector unit 106 secured to the gimbal structure 112 via the gimbal 114. In a preferred embodiment, the gimbal 114 and the cradle 104 are secured together at the pivot points 208. The pivot points are aligned so as to create an axis of rotation 1102 so that the reflective trough 102 is able to selectively rotate about the axis of rotation 1102. Preferably, the axis of rotation 1102 is aligned with and is parallel with the focal line 904.

In some embodiments, the concentrated solar energy system 100 may be shipped in a disassembled state to an installation site. Workers at the site may assemble the support 116, then assemble the cradle 104, and then attach the cradle 104 to the support 116. The mirror panels 502 may then be secured to the cradle 104. The solar evacuated tube heat collector 108 and wave guide 112 can then be secured to the cradle 104. The optional photovoltaic cell units 110 can then be secured to the cradle 104. After assembly, the electrical connectors of the photovoltaic cell units 110 may be coupled to a suitable electrical load (battery, capacitor, thermal storage salt, motor, lighting device, etc.). Concurrently, the solar evacuated tube heat collector 108 can be fluidly coupled to another device that receives the heated working fluid from the transparent fluid container member 108*a*.

Additionally, the gimbal 114 may be optionally configured to allow a change in horizontal orientation (pitch) of the concentrated solar energy system 100. For example, the height of the gimbal portion 1104 may be adjusted to raise or lower the rear end of the reflective trough 102 to change the horizontal orientation, as conceptually illustrated by the angle 1106 (at a pitch axis 1108). For example, the supports of each gimbal 114 may be adjustable in length. Alternatively, or additionally, a length of one or more of the legs of the support 116 may be adjustable. In some embodiments, the gimbal 114 and/or the support 116 may be configured to vertically orient the concentrated solar energy system 100, such as when the concentrated solar energy system 100 is not in use, is exposed to severe adverse weather conditions, and/or to remove accumulated objects, such as snow, ice, leaves, or other debris.

The example gimbal 114 illustrated in the FIGS. is intended to be a non-limiting embodiment of a gimbal 114. Any suitable gimbal 114 now known or later developed are intended to be incudes within the scope of this disclosure and to be protected by any subsequently filed claims.

It is appreciated that the gimbal 114 can be configured to raise and/or lower the rear edge of the concentrated solar energy system 100 using a piston that is actuated by fluid, or a rod drive by a worm drive.

Any suitable controller system 1402 (FIG. 14) may be used to automatically control orientation of the gimbal 114 in real time. The controller system 1402 operates the gimbal 114 to continuously orient (or periodically orient) the reflective trough 102 towards the sun so that the reflective trough 102 reflects a maximum amount of sunlight up towards the focal line 904 (FIG. 9). Various sensors 1404 may provide input to the controller system 1402. For example, a sensor 1404 that senses the location of the sun in the sky may provide information for the controller system 1402 to compute the optimal azimuth orientation and/or zenith orientation of the reflective trough 102. That is, the controller system 1402 may operate the gimbal 114 so that the reflective trough 102 is moved to track the sun as it moves across the sky during the day.

Legacy reflective parabolas have also been used to gather and reflect incident sunlight. For example, a parabolic cooker may be used to reflect and focus incident sunlight to a focal point. With some embodiments, an object, such as a pan or food, can be located at the focal point along the axis 904 and heated. In some embodiments, the evacuated tube heat collector 108 may be removeable, and another supporting structure or heating device may be secured to the supports 118.

Figure 12:
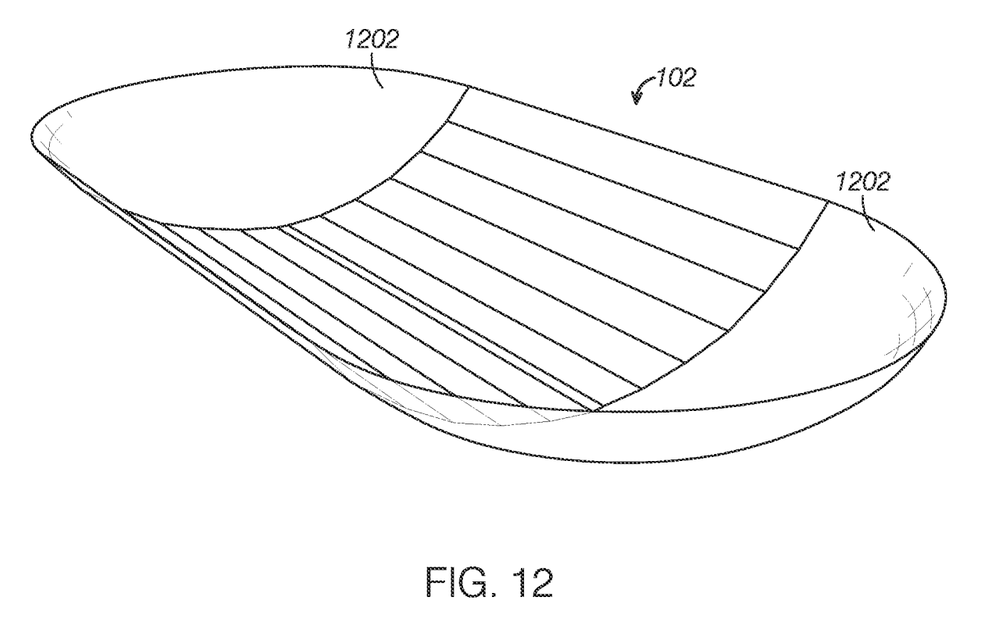
FIG. 12 is a perspective view of two end cap concentrators disposed at the ends of the reflective trough.
Figure 13:
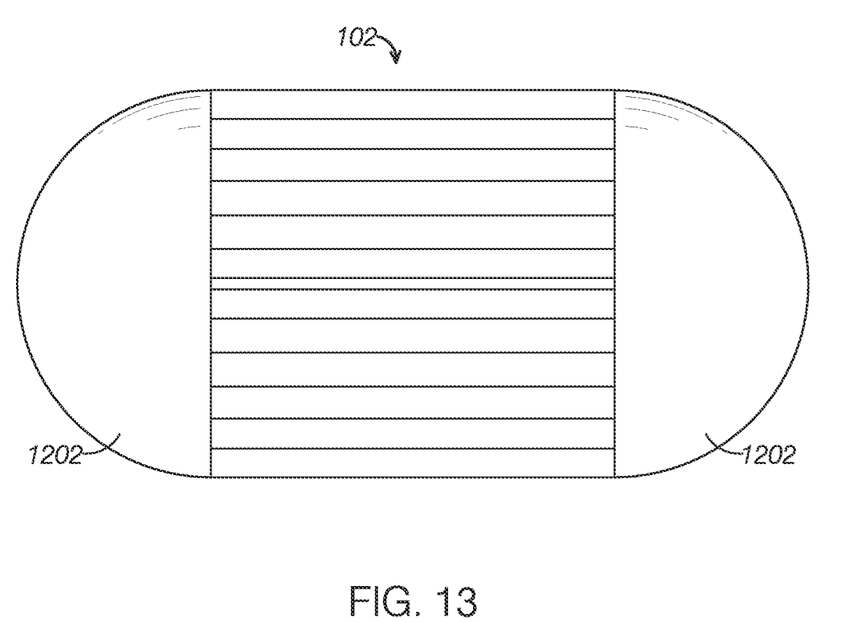
FIG. 13 is a top view of the two end cap concentrators disposed at both ends of the reflective trough.

FIG. 12 is a perspective view of two optional end cap concentrators 1202 disposed at the ends of the reflective trough 102. FIG. 13 is a top view of the end cap concentrators 1202 disposed at both ends of the reflective trough 102. The end cap concentrators 1202 are similar to half of a legacy reflective parabola. The curvature of the end cap concentrators 1202 is defined so as to reflect incident sunlight upward towards the focal line 904 (FIG. 9) where the solar evacuated tube heat collector 108 and the wave guide 112 are located.

In this non-limiting example embodiment, a first end cap concentrator 1202 is secured to one end of the reflective trough 102. A second end cap concentrator 1202 is secured to the opposing end of the reflective trough 102. The width (diameter) of the end cap concentrators 1202 substantially corresponds to a length between the two opposing upper edges of the reflective trough 102. Preferably, the curvature of the end cap concentrator 1202 corresponds to the curvature of the reflective trough 102. Accordingly, the end cap concentrators 1202 may be secured to the front and back edges of the reflective trough 102 and/or to the front and back end stringers 106.

Sunlight incident on the two end cap concentrators 1202 reflect incident sunlight towards the solar evacuated tube heat collector 108 and the wave guide 112. One skilled in the art appreciates that the shape of the end cap concentrators 1202 does not necessarily have to be exactly parabolic to reflect a portion of the incident solar energy up towards the solar evacuated tube heat collector 108 and the wave guide 112.

In some embodiments, one or both ends of the solar evacuated tube heat collector 108 may be configured to receive solar energy from an end cap concentrator 1202. For example, an end of the transparent fluid container member 108a of the solar evacuated tube heat collector 108 may be bulbous or otherwise enlarged to receive solar energy reflected from the end cap concentrator 1202. In some embodiments, the end of the transparent fluid container member 108a may extend outwardly beyond the securing member 304 at the top of the support member 118. For example, but not limited to, one or more ninety degree elbows at the end of the transparent fluid container member 108a, or a curved end of the transparent fluid container member 108a, may located at the ends of the transparent fluid container member 108a to receive reflected solar energy from an end cap concentrator 1202.

Figure 14:
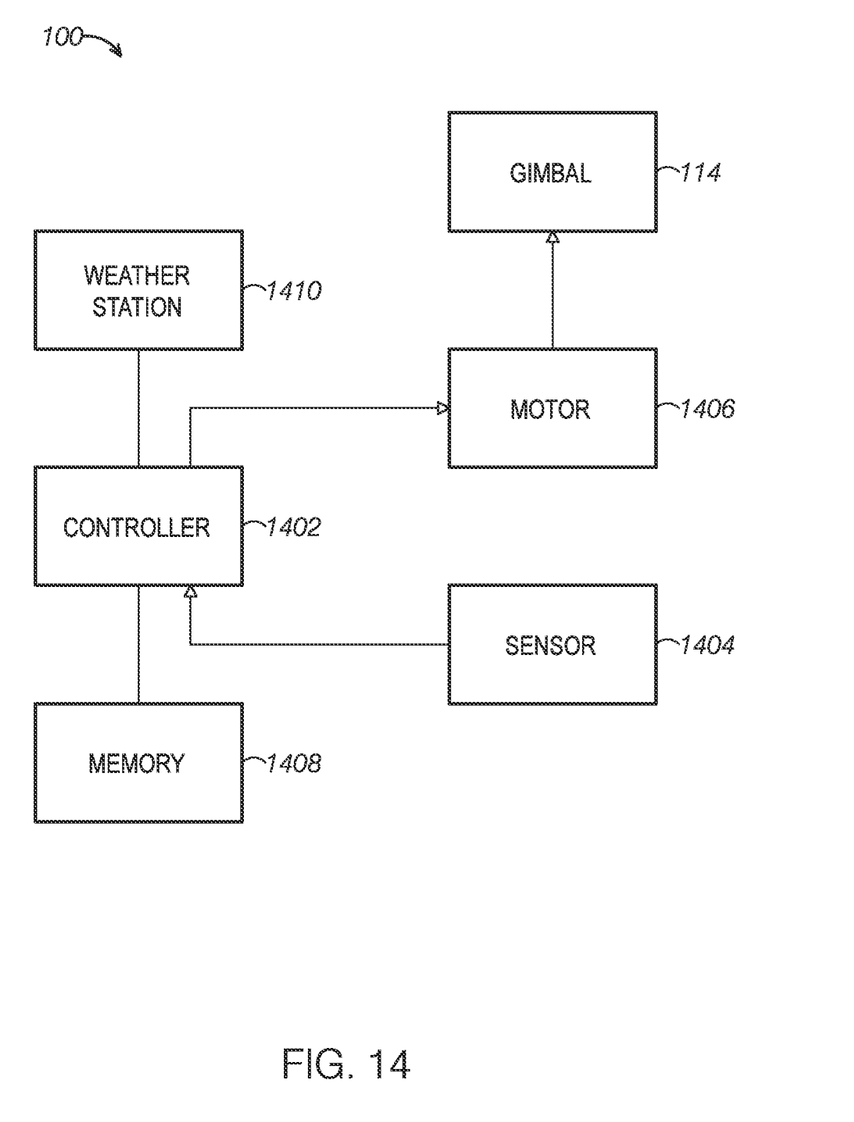
FIG. 14 is a block diagram of a controller system that controls orientation of the concentrated solar energy system.

In some embodiments, a weather station 1410 is communicatively coupled to the controller 1402 of the gimbal control system that controls the gimbal 114. Sensors at a weather station 1410 may provide input to the controller system 1402. Information acquired by the sensors of the weather station 1410 may be saved into the memory 1408 for later analysis. Operational information from the controller 1402 may also be saved into memory 1408 for later analysis. Such information may be communicated to a remote server or electronic device for analysis by an operator.

If severe adverse weather conditions are detected at the weather station 1410, such as a high speed destructive wind, the concentrated solar energy system 100 may reorient the reflective trough 102 to avoid potential damage that could otherwise be cause by incident high speed winds. If a large accumulation of snow is detected at the weather station 1410, the concentrated solar energy system 100 may operate the gimbal 114 to minimize accumulation of snow fall and/or to help remove the snow fall from the concentrated solar energy system 100

In some embodiments having one or both end cap concentrators, the wave guide 112 may be omitted.

FIG. 14 is a block diagram of a controller system that controls orientation of the concentrated solar energy system. The controller system comprises a controller 1402, a sensor 1404, and at least one motor 1406. The sensor 1404, which may be a directional CCD or the like, acquires information corresponding to the location of the sun. Alternatively, or additionally, a sensor may sense an amount of incident solar energy reflected from the reflective trough 102 and/or an end cap concentrator 1202.

The controller 1402, communicatively coupled to the sensor 1404, process information received from the sensor 1404 to determine location of the sun in the sky and/or to determine an amount of incident reflected solar energy. In some embodiments, the position of the reflective trough 102 may be changed in real time to optimize its orientation for the current azimuth orientation and/or zenith orientation of the sun. Alternatively, or additionally, a memory 1408 may include a database of known azimuth orientation and/or zenith orientation of the sun for particular days and times so that the controller 1402 can control the orientation of the reflective trough 102 and/or the end cap concentrators 1202. For example, but not limited to, the controller 1402 may, at the end of daylight, re-orient the reflective trough 102 to a known orientation so as to receive incident sunlight at sunrise.

The controller 1402 is controllably coupled to the motor 1406. Control signals communicated from the controller 1402 to the motor 1406 causes the motor 1406 to rotatably adjust orientation of the gimbal 114 so that the orientation of the reflective trough 102 is adjusted to track the location of the sun on a real time basis. In such embodiments, the concentrated solar energy system 100 can be installed in a field location that does not have supporting electric utility infrastructure to otherwise power the motor 1406. That is, the concentrated solar energy system 100 is able to track location of the sun using electrical power generated by the photovoltaic cell units 110.

Other motors 1406 may be used to adjust orientation of the reflective trough 102 in other manners. For example, a motor 1406 may be used to adjust the orientation of the reflective trough 102 along the pitch axis 1108 to adjust the angle 1106 (FIG. 11).

It should be emphasized that the above-described embodiments of the concentrated solar energy system 100 are merely possible examples of implementations of the invention. Many variations and modifications may be made to the above-described embodiments. All such modifications and variations are intended to be included herein within the scope of this disclosure and protected by any later filed claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

Therefore, having thus described the invention, at least the following is claimed:

1. A concentrated solar energy system, comprising:
   a reflective trough with a reflective upper surface, wherein the reflective upper surface of the reflective trough reflects incident sunlight energy towards a focal line;
   a solar evacuated tube heat collector,
      wherein the solar evacuated tube heat collector is defined by a transparent fluid container member that has a length that corresponds to a length of the reflective upper surface of the reflective trough, and
      wherein the solar evacuated tube heat collector is located along the focal line associated with the reflective trough such that an interior of the transparent fluid container member encompasses the focal line;
   a wave guide located above and in proximity to the solar evacuated tube heat collector,
      wherein the wave guide is defined by a length corresponding to the length of the solar evacuated tube heat collector, and
      wherein a lower surface of the wave guide is a reflective lower surface that reflects incident sunlight energy downwards onto the solar evacuated tube heat collector; and
   a cradle,
      wherein the cradle is defined by a length that corresponds to the length of the reflective trough, and
   wherein the cradle secures the reflective trough, the solar evacuated tube heat collector, and the wave guide in position with respect to each other and
   a photovoltaic cell unit with a plurality of photovoltaic cells oriented in an upward direction to receive incident sunlight energy so that the received incident sunlight energy is converted to electrical energy,
      wherein the photovoltaic cell unit is configured to be electrically coupled to an electrical load; and
   wherein the photovoltaic cell unit is defined by a length that corresponds to the length of the solar evacuated tube heat collector, and
   wherein the photovoltaic cell unit is secured to a top surface of the wave guide; and wherein the photovoltaic cell unit is defined by a length that corresponds to the length of the wave guide, and
   wherein the plurality of photovoltaic cells are fabricated onto a top surface of a substrate of the wave guide; and
   an end cap concentrator secured to an end of the cradle,
   wherein the end cap concentrator is shaped as half of a reflective parabola, and
      wherein the end cap concentrator reflects incident sunlight upward towards the focal line and the wave guide; and
      wherein the end cap concentrator is defined by a width that corresponds to a length between a first upper edge of the reflective trough and an opposing second upper edge of the reflective trough; and
   a second end cap concentrator secured to an opposing end of the cradle,
   wherein the second end cap concentrator is shaped as half of a reflective parabola, and
      wherein the second end cap concentrator reflects incident sunlight upward towards the focal line and the wave guide.

2. The concentrated solar energy system of claim 1, wherein the photovoltaic cell unit is defined by a length that corresponds to a length of the cradle, and
   wherein the photovoltaic cell unit is secured to a top surface of an edge of the cradle.

3. The concentrated solar energy system of claim 2, wherein the photovoltaic cell unit is a first photovoltaic cell unit, and further comprising:
   a second photovoltaic cell unit secured to an opposing edge of the cradle.

4. The concentrated solar energy system of claim 1, further comprising:
   a gimbal coupled to a stringer of the cradle; and
   a support coupled to the gimbal,
      wherein the cradle is rotatably coupled to the support by the gimbal,
      wherein the support may be placed on the ground or may be secured to a structure, and
      wherein the cradle may be rotated so that an orientation of the reflective trough is adjusted towards the sun.

5. The concentrated solar energy system of claim 4, wherein the electric load is a motor, and further comprising:
   a sensor that detects location of the sun;
   a controller communicatively coupled to the sensor; and
   a motor controllably coupled to the controller,
      wherein the motor rotatably adjusts the gimbal to control orientation of the cradle so that the reflective trough tracks position of the sun.

6. The concentrated solar energy system of claim 4, wherein the gimbal is a first gimbal coupled to a front end stringer of the cradle further comprising:
   a second gimbal coupled to a back end stringer of the cradle,
   wherein the support is coupled to the second gimbal, and
   wherein the support is rotatably coupled to the cradle by the second gimbal.

7. The concentrated solar energy system of claim 1,
   wherein a fluid residing within the transparent fluid container member is heated by the incident sunlight,
   wherein the heated fluid is fluidly transported to a collection device that receives heat from the heated fluid, and
   wherein the fluid is recirculated back into the transparent fluid container member after the heat has been removed from the fluid be the collection device.

8. The concentrated solar energy system of claim 1, wherein the reflective trough comprises:
   a plurality of mirror panels aligned side by side to define the reflective trough,
   wherein an upper surface of each mirror panel is made of a highly reflective material, and
   wherein a lower surface of each mirror panel is configured to be secured to the cradle.

9. The concentrated solar energy system of claim 8, wherein the plurality of mirror panels comprises:
   a first mirror panel, and
   a second mirror panel,
   wherein the first mirror panel and the second mirror panel are aligned side by side, and
   wherein a space between the first mirror panel and the second mirror panel is located proximate to a centerline of the reflective trough.

10. The concentrated solar energy system of claim 8, wherein a top surface of each of the plurality of mirror panels is curved to reflect incident sunlight energy towards the focal line.

* * * * *